United States Patent [19]

Marshall

[11] Patent Number: 5,161,426
[45] Date of Patent: Nov. 10, 1992

[54] AUTOMOTIVE SPEEDOMETER ASSEMBLY WITH INTEGRAL ANTI-FOULING GREASE SEAL

[75] Inventor: James E. Marshall, Southfield, Mich.

[73] Assignee: Ford Motor Company, Dearborn, Mich.

[21] Appl. No.: 583,755

[22] Filed: Sep. 17, 1990

[51] Int. Cl.$^5$ .................. F16C 1/10; F16C 33/74
[52] U.S. Cl. .................. 74/502.4; 74/502.6; 277/152; 464/53; 384/146; 403/330
[58] Field of Search ............ 277/152 X; 74/501.5 R, 74/502.4, 502.6, 12; 464/53, 57, 173; 403/330 X; 384/146

[56] References Cited

U.S. PATENT DOCUMENTS

| | | | |
|---|---|---|---|
| 1,433,537 | 10/1922 | Elliott . | |
| 1,803,059 | 4/1931 | Ford | 464/53 X |
| 1,897,964 | 2/1933 | Zubaty | 464/53 X |
| 2,454,036 | 11/1948 | Wright | 277/152 X |
| 2,818,283 | 12/1957 | Hutterer | 277/152 X |
| 2,872,793 | 2/1959 | Botti | 464/53 |
| 2,884,771 | 5/1959 | Holt | 464/53 |
| 2,981,573 | 4/1961 | Reuter | 277/152 X |
| 2,983,125 | 5/1961 | Peickii et al. | 64/32 |
| 3,105,368 | 10/1963 | Osterhoudt | 64/4 |
| 3,355,964 | 12/1967 | Day | 464/53 |
| 3,393,534 | 7/1968 | Hanebuth | 464/53 |
| 3,440,836 | 4/1969 | Petersen | 464/53 |
| 3,717,394 | 2/1973 | Pitner | 308/187.1 |
| 3,785,752 | 1/1974 | Crespo | 417/319 |
| 4,027,501 | 6/1977 | Hanebuth | 464/53 |
| 4,093,241 | 6/1978 | Muntjanoff et al. | 277/152 X |
| 4,134,596 | 1/1979 | Kawai et al. | 277/152 |
| 4,437,821 | 3/1984 | Ogawa | 277/152 X |
| 4,449,717 | 5/1984 | Kitawaki et al. | 277/152 X |
| 4,465,285 | 8/1984 | Toyoda et al. | 277/152 X |
| 4,641,979 | 2/1987 | Stone | 384/146 |
| 4,884,467 | 12/1989 | Martell | 74/501.5 R |
| 5,033,872 | 7/1991 | Ueno et al. | 384/146 X |

*Primary Examiner*—Vinh T. Luong
*Attorney, Agent, or Firm*—Jerome R. Drouillard; Clifford L. Sadler

[57] ABSTRACT

An automotive speedometer assembly includes a speedometer head, a cable for mechanically driving the head and a seal positioned within the cable proximate the head for preventing infiltration of lubricant from the cable into the head.

3 Claims, 1 Drawing Sheet

AUTOMOTIVE SPEEDOMETER ASSEMBLY WITH INTEGRAL ANTI-FOULING GREASE SEAL

BACKGROUND OF THE INVENTION

This invention relates to a speedometer assembly for an automotive vehicle incorporating an integral anti-fouling grease seal.

FIELD OF THE INVENTION

Mechanically driven speedometers and tachometers have been used in automotive vehicles for many years. Typically, such units are driven by helically wound spring cables powered by the engine or transmission of the vehicle. In order to prolong the life of the spring cable driving element, such cables are commonly lubricated. Because the outer wrapping of the spring cable is capable of functioning as an Archimedes screw, it has been determined that lubricant applied to the cable may be caused to work up to the instrument cluster if the cable is rotated in the direction giving the screw a positive lead angle. Undesirably, such rotation of the cable could cause lubricant to migrate up the cable and into the head of the speedometer. In response to this, the cable is commonly run so that the Archimedes screw effect is voided by operating the cable at a negative lead angle. Alternatively, a seal could be incorporated within the head of the speedometer itself. The present invention solves the problem presented by situations wherein it is either not possible to operate the cable in the rotational direction which avoids migration of lubricant into the speedometer head, or it is not desired to put a seal in the housing of the speedometer, thereby engendering the cost of sealing all such speedometers in given product line, even those used with cables not causing a problem. Accordingly, the present invention involves the placement of an anti-fouling grease seal proximate the speedometer head, with the seal being housed within a ferrule attached to the end of the drive cable.

U.S. Pat. No. 3,105,368 discloses a speedometer cable having a bead which forms a self-centering bearing which does not serve to Prevent the infiltration of lubricant into the speedometer head. U.S. Pat. No. 1,433,537 and U.S. Pat. No. 3,785,752 disclose flexible drive shaft arrangements having seals which are not suitable for the interposition between a speedometer or tachometer drive cable and the driven head. Finally, U.S. Pat. No. 2,983,125 and U.S. Pat. No. 3,717,394 disclose lip type seals of the type commonly used for sealing differential slip yokes and universal joint trunions, respectively. Neither of these types of seals is suitable for use as a seal positioned between a speedometer drive cable and the speedometer head.

It is an object of the present invention to provide an automotive speedometer system using an integral anti-fouling seal to prevent migration of lubricant from the drive cable into the speedometer head.

SUMMARY OF THE INVENTION

An automotive speedometer assembly includes a speedometer head, a cable for mechanically driving the head, and a seal positioned proximate the head for preventing the infiltration of lubricant from the cable into the head. The seal is preferably contained within a ferrule mounted to an end of the cable and comprises a generally annular body having an outer diametral element engaged with the ferrule and a radially inwardly extending inner element engaged with the drive hub of the head. The radially inwardly extending element may comprise a lip which is slidingly engaged with the drive hub of the head. The cable included in the present assembly includes a flexible outer sheath and a wound spring inner member having a helical wrap. In a preferred embodiment, the seal lip extends radially inwardly at an acute angle to the outer diametral surface of the seal. The purpose of the seal is to Prevent infiltration of lubricant from the cable into the head and also for establishing the axial spacing of the cable and the head. Accordingly, the seal also comprises two axially opposed faces with one face in contact with the ferrule and the other face in contact with the outer housing of the speedometer head.

DETAILED DESCRIPTION OF THE PREFERRED EMBODIMENT

Figure 1:
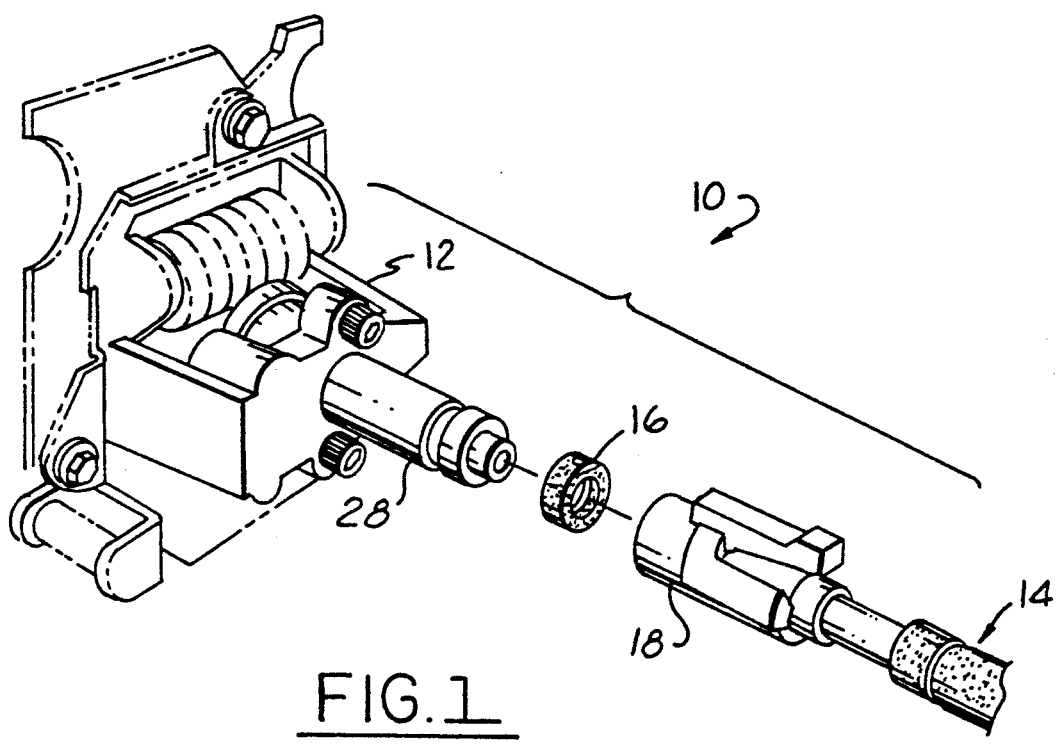
FIG. 1 is an exploded perspective of a system according to the present invention.
Figure 2:
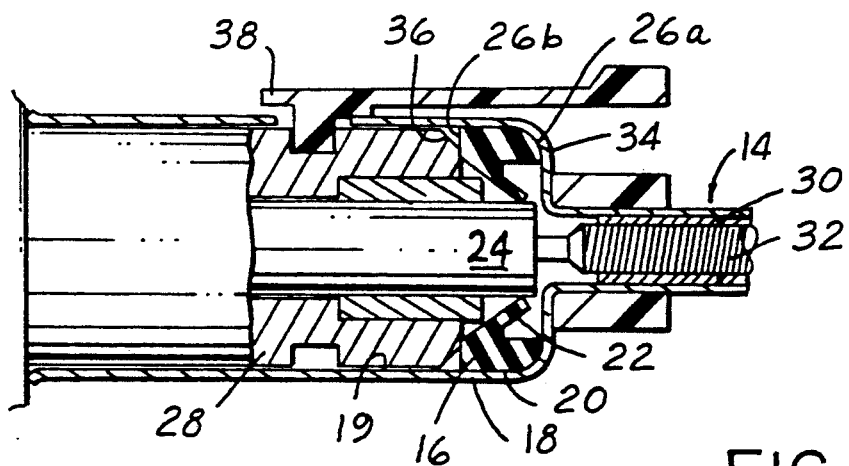
FIG. 2 is a partially broken away view of a speedometer cable joined to a speedometer head and also incorporating a seal according to the present invention.
Figure 3:
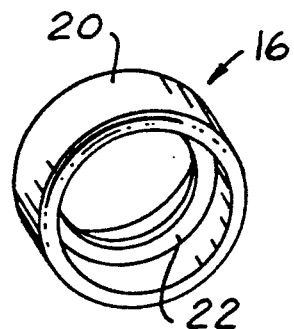
FIG. 3 is a perspective view of a seal according to the present invention.

As shown in FIG. 1, an automotive speedometer assembly 10 according to the present invention includes speedometer head 12 having an outer housing 28, and cable 14 which is clipped to the outer housing, with seal 16 interposed between speedometer head 12 and cable 14. As shown with particularity in FIG. 2, seal 16 is housed within ferrule 18, which is mounted at the end of cable 14. Seal 16 is positioned so that its outer diametral surface 20 (FIG. 3), is in contact with the inner cylindrical surface 19 of ferrule 18. Cable 14 further comprises flexible outer sheath 30 and wound spring inner member 32. As seen in FIG. 2, inner member 32 has a helically wound outer wrap which tends to function as an Archimedes screw when it is rotated in the presence of fluid such as lubricant applied to the inner member.

Seal 16 has a first axially opposed face 26a which is in contact with shoulder 34 of ferrule 18 and a second axially opposed face 26b, which is in contact with the annular end of 36 of outer housing 28. Accordingly, seal 16 functions to cooperate with clip 38 to establish the axial position of ferrule 18 and hence, cable 14, with outer housing 28 of speedometer head 12.

The anti-fouling capability of seal 16 is provided by radially inwardly extending element 22, which contacts drive hub 24 of speedometer head 12. The lip 22 is slidingly engaged with drive hub 24 in two ways. First, when cable 14 is mated to speedometer head 12 the seal slides axially over the drive hub. Thereafter, the seal slides rotationally with respect to the drive hub during operation of the speedometer.

As shown in FIG. 2, lip element 22 makes an acute angle with outer diametral surface 20 of seal 16. This angular relationship assures that the pressure force of any lubricant pumped up by wound spring inner member 32 to the area of the cable/head interface will press more tightly upon, and thereby cause greater engagement of, seal lip 22 with drive hub 24, thereby effectively preventing the infiltration of lubricant into the speedometer head. It has been determined that the infiltration of lubricant is undesirable with certain speedometer heads, as such lubricant may impair the functioning of magnetically driven units. The present invention thus provides an inexpensive preventative device for avoiding harmful contamination of the speedometer head.

As used herein, the term "speedometer" means either a conventional speedometer-odometer combination or conventional mechanically driven engine tachometer.

Those skilled in the art will appreciate in view of this disclosure that a seal according to the present invention could be used for slidably engaging not only a speedometer drive hub as shown; alternatively, the present seal could engage a suitable surface or suitable body provided at the termination of the drive cable itself. In either event, the seal will function according to the present invention to prevent contamination of the speedometer head by lubricant brought up into the area of the head by the functioning of the drive cable as an Archimedes screw.

The invention has thus been shown and described with reference to specific embodiments; however, it should be noted the invention is no way limited to the details of the illustrated structures but changes in modifications may be made without departing from the appended claims.

I claim:

1. An automotive speedometer assembly, comprising:
    a speedometer head having a drive hub for accepting a drive cable;
    a drive cable for rotatably driving said head; and
    a seal positioned proximate said head for preventing the infiltration of lubricant from said drive cable into said head, with said seal comprising a generally annular body having an outer diametral surface engaged with a ferrule mounted to one end of said drive cable and a radially inwardly extending lip slidingly engaged with the drive hub of said head wherein said seal lip extends radially inwardly at an acute angle to said outer diametral surface.

2. An automotive speedometer assembly according to claim 1, wherein said drive cable comprises a flexible outer sheath and a wound spring inner member having a helical wrap.

3. An automotive speedometer assembly, comprising:
    a speedometer head having an outer housing in which a drive hub is journaled;
    a cable for rotatably driving said head; and
    a combination seal and spacer unit positioned proximate said head for preventing the infiltration of lubricant from said cable into said head and for establishing the axial spacing of said cable and said head, with said seal comprising a generally annular body having an outer diametral surface engaged with a ferrule mounted to one end of said cable, a radial lip extending inwardly from the outer diametral surface and slidingly engaged with the drive hub of said head, and two axially opposed faces, with one such face in contact with said ferrule and the other such face in contact with said outer housing wherein said seal lip extends radially inwardly at an acute angle to said outer diametral surface.

* * * * *